(12) United States Patent
Ehninger et al.

(10) Patent No.: US 10,627,152 B2
(45) Date of Patent: Apr. 21, 2020

(54) DOMESTIC REFRIGERATION APPLIANCE HAVING AN EXTERNAL HOUSING OF AN ICEMAKER AND A FRAME AT THE FRONT

(71) Applicant: BSH HAUSGERAETE GMBH, Munich (DE)

(72) Inventors: Christian Ehninger, Giengen an der Brenz (DE); Prashantagouda Hosamani, Ulm (DE); Klaus Maier, Herbrechtingen (DE); Robert Stahl, Herbrechtingen (DE)

(73) Assignee: BSH Hausgeraete GmbH, Munich (DE)

( * ) Notice: Subject to any disclaimer, the term of this patent is extended or adjusted under 35 U.S.C. 154(b) by 49 days.

(21) Appl. No.: 15/716,563

(22) Filed: Sep. 27, 2017

(65) Prior Publication Data

US 2018/0087825 A1    Mar. 29, 2018

(30) Foreign Application Priority Data

Sep. 28, 2016  (DE) .......................... 10 2016 218 651

(51) Int. Cl.
| | |
|---|---|
| F25D 23/06 | (2006.01) |
| F25C 5/18 | (2018.01) |
| F25D 11/02 | (2006.01) |
| F25D 23/08 | (2006.01) |
| F25C 5/182 | (2018.01) |
| F25D 23/02 | (2006.01) |

(52) U.S. Cl.
CPC ............ F25D 23/062 (2013.01); F25C 5/182 (2013.01); F25D 23/069 (2013.01); F25D 23/087 (2013.01); F25D 11/02 (2013.01); F25D 23/025 (2013.01); Y02B 40/34 (2013.01)

(58) Field of Classification Search
CPC ...... F25D 23/062; F25D 23/087; F25D 11/02; F25D 23/025; F25D 23/069; F25D 23/066; F25D 2201/10; F25C 5/182; Y02B 40/34
See application file for complete search history.

(56) References Cited

U.S. PATENT DOCUMENTS

| | | | | |
|---|---|---|---|---|
| 3,633,374 | A * | 1/1972 | Canter | F25D 11/02 62/156 |
| 4,087,140 | A * | 5/1978 | Linstromberg | F25C 5/22 312/292 |
| 5,992,167 | A * | 11/1999 | Hill | F25C 1/04 62/188 |
| 6,286,324 | B1 * | 9/2001 | Pastryk | F25C 5/187 62/137 |
| 7,337,620 | B2 | 3/2008 | Coulter et al. | |
| 7,591,141 | B2 * | 9/2009 | Wetekamp | F25D 11/02 62/187 |

(Continued)

*Primary Examiner* — Melvin Jones
(74) *Attorney, Agent, or Firm* — Laurence A. Greenberg; Werner H. Stemer; Ralph E. Locher

(57) ABSTRACT

A domestic refrigeration appliance has a housing in which there is formed at least one receiving space for food that is delimited by walls of an internal container. An icemaker has an external housing that is separate from the internal container and that is preferably inserted in an inset region of the internal container and that has a charging opening. A separate frame is arranged on a front edge of the external housing. The separate frame delimits the charging opening.

18 Claims, 6 Drawing Sheets

(56) References Cited

U.S. PATENT DOCUMENTS

| | | | | |
|---|---|---|---|---|
| 7,646,565 | B2* | 1/2010 | Biskeborn | G11B 5/1872 |
| | | | | 360/121 |
| 8,966,926 | B2* | 3/2015 | Eveland | F25C 5/22 |
| | | | | 62/377 |
| 2004/0261442 | A1* | 12/2004 | Chung | F25C 5/046 |
| | | | | 62/344 |
| 2006/0090496 | A1* | 5/2006 | Adamski | F25C 5/005 |
| | | | | 62/344 |
| 2011/0259036 | A1* | 10/2011 | Lim | F25C 1/24 |
| | | | | 62/344 |
| 2012/0291473 | A1* | 11/2012 | Krause | F25D 23/067 |
| | | | | 62/340 |

* cited by examiner

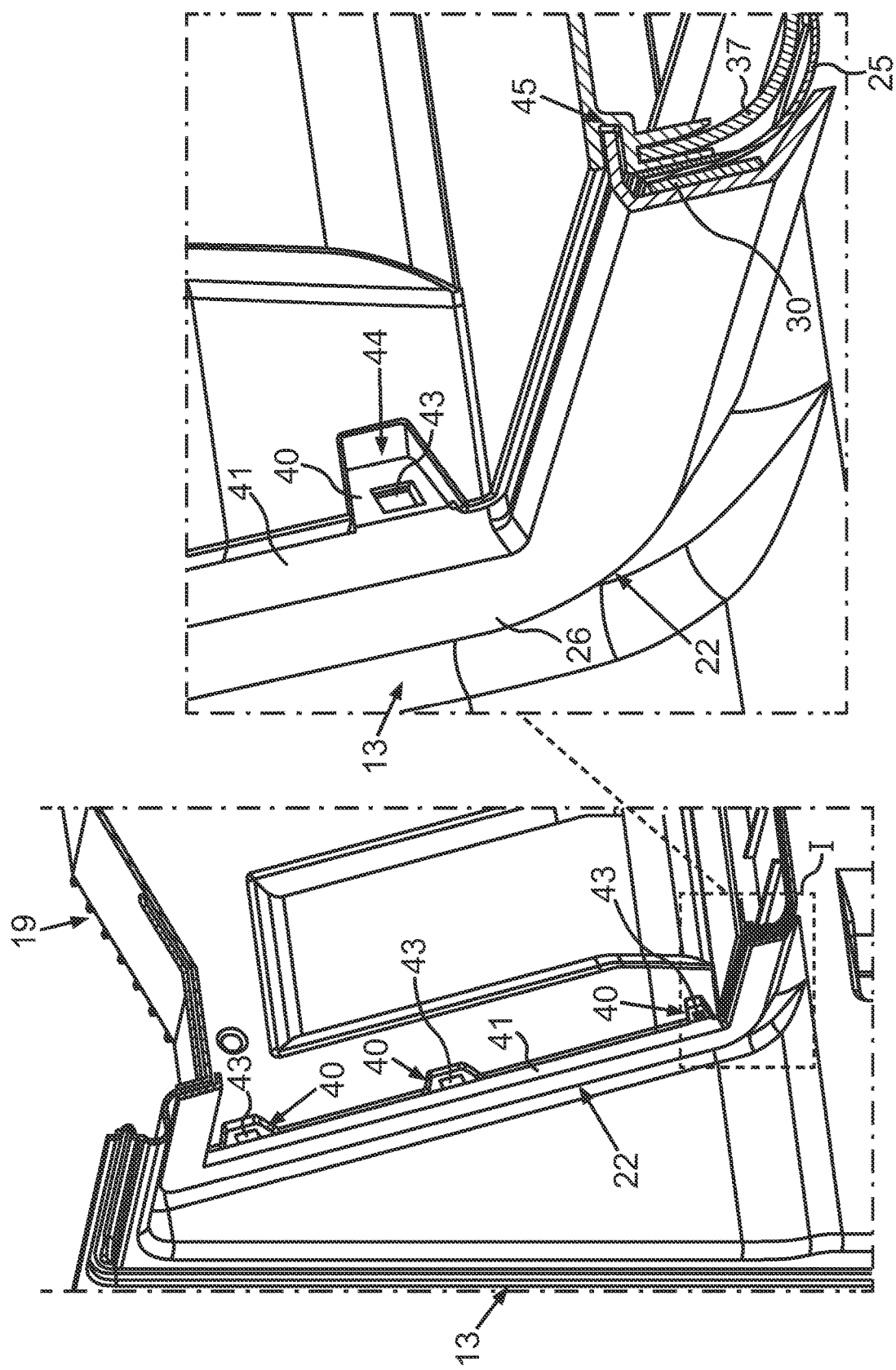

DOMESTIC REFRIGERATION APPLIANCE HAVING AN EXTERNAL HOUSING OF AN ICEMAKER AND A FRAME AT THE FRONT

CROSS-REFERENCE TO RELATED APPLICATION

This application claims the benefit, under 35 U.S.C. § 119, of German patent application DE 10 2016 218 651.5, filed Sep. 28, 2016; the prior application is herewith incorporated by reference in its entirety.

BACKGROUND OF THE INVENTION

Field of the Invention

The invention relates to a domestic refrigeration appliance. The appliance has a housing in which there is formed at least one receiving space for food. The space is delimited by walls of an internal container. The domestic refrigeration appliance moreover includes an icemaker that is intended to produce shaped ice elements such as ice cubes or crushed ice. The icemaker has an external housing that is separate from the internal container and is inserted in an inset region of the internal container. The external housing has a charging opening at the front.

A domestic refrigeration appliance of this kind is known for example from U.S. Pat. No. 7,337,620 B2.

Specifically in the case of domestic refrigeration appliances in which this icemaker is arranged in a receiving space that takes the form of a refrigerator compartment, this icemaker must also be appropriately thermally insulated from this refrigerator compartment, in which higher temperatures are to be established. The internal container that delimits this receiving space by means of its walls is conventionally manufactured by a deep drawing method. The external contour of the external housing of the icemaker is for example also manufactured by a corresponding shaping method. Consequently, at specific points there may be relatively thin material thicknesses of the internal container or indeed of the external housing of the icemaker, so that in some cases the action of relatively small forces may result in undesired deformation or other damage to the said components.

SUMMARY OF THE INVENTION

It is accordingly an object of the invention to provide a domestic appliance which overcomes the above-mentioned and other disadvantages of the heretofore-known devices and methods of this general type and to provide a domestic refrigeration appliance in which such an external housing of an icemaker and/or adjacent regions of an internal container are protected from undesired damage in an improved manner.

With the foregoing and other objects in view there is provided, in accordance with the invention, a domestic refrigeration appliance. The novel appliance comprises:

a housing in which there is formed at least one receiving space for food that is delimited by walls of an internal container;

an icemaker with an external housing that is separate from the internal container and is formed with a charging opening; and a separate frame arranged on a front edge of said external housing of the icemaker and delimiting the charging opening In other words, a domestic refrigeration appliance according to the invention includes a housing in which there is formed at least one receiving space for food. The receiving space is delimited by walls of an internal container. The receiving space in particular takes the form of a refrigerator compartment of the domestic refrigeration appliance. In particular, the domestic refrigeration appliance moreover also includes a further, separate receiving space that takes the form of a freezer compartment.

Moreover, the domestic refrigeration appliance includes an icemaker that is arranged in particular outside the receiving space that in particular forms the refrigerator compartment region.

In particular, the icemaker is arranged in a hollow or recess in an internal container that delimits the receiving space by means of its walls. The internal container preferably has a hole or aperture through which the icemaker extends by means of its external housing or against which it abuts by means of its rear side. The icemaker is accessible from the front, with the result that it is only accessible when a door that closes the receiving space is open. The icemaker has a front cover that is a front viewing component and forms a wall by which the icemaker is thermally insulated, preferably also from the receiving space. The icemaker is arranged at least such that a wall region, namely the cover, of the icemaker directly delimits the receiving space. In particular, there is provided a receiving space of the icemaker that, by means of its front wall, forms this wall region directly delimiting the receiving space. This front wall is in particular only accessible through a front charging opening of the receiving space. In particular, the icemaker is arranged in the receiving space only by means of this front wall, and is otherwise arranged outside the receiving space.

The icemaker is a component of a dispenser unit that is part of the domestic refrigeration appliance and is intended to automatically discharge at least shaped ice elements, depending on a request by a user.

The icemaker includes an external housing that is separate from the internal container and is inserted and accordingly arranged, preferably in a use region, of the internal container. The external housing has a charging opening, through which, at the front, components of the icemaker may be introduced into the external housing and removed therefrom again, or are accessible. In particular, such components of the icemaker are for example an ice shaping dish, which predetermines shapes of shaped ice elements to be prepared. Furthermore, one component of an icemaker may be the receiving container in which shaped ice elements that have been produced by the ice shaping dish can be received. This receiving container may be pushed into and pulled out of the external housing.

It may be provided for the shaped ice elements to be accessible by pulling out the receiving container and removing them accordingly. In particular, it is provided for the domestic refrigeration appliance to have a dispenser unit by which the shaped ice elements can be taken by way of the icemaker to a discharging unit, which is in particular arranged in a door that closes the receiving space. With a construction of this kind, it is then possible to discharge and remove the shaped ice elements without opening the door that closes the receiving space in which the icemaker is in fact arranged. In particular, in that case a chute through which the shaped ice elements can be transported from the receiving container to the discharging unit is arranged between the icemaker and the discharging unit. Specifically with a construction of this kind, it is then also possible for a screw conveyor to be arranged in the receiving container in order to enable the collected shaped ice elements to be taken to the chute.

A primarily important idea of the invention can be seen in the fact that a separate frame is arranged on a front edge, which delimits the charging opening at the front, and thus at an edge of the external housing of the icemaker that faces the charging opening of the receiving space. A construction of this kind has the effect of specifically protecting a crucial point on the external housing and hence also on the internal container from the effects of undesired mechanical forces and resulting damage. Because it is specifically at this front edge of the external housing that relatively thin material thicknesses of the external housing may in some cases occur, and in this context too the internal container is brought up to this front edge of the external housing and is constructed to have a correspondingly relatively thin material thickness, the effects of forces here may result in undesired deformations or damage to a particularly great extent. This in turn has an effect on the seal-tightness and the thermal insulation effect between the external housing and the icemaker compartment, which would in turn also be disadvantageous. Moreover, it is specifically this exposed point on the external housing that is to be protected from the effects of forces, which may in some cases be undesirably high, resulting from an external housing for the said shaped ice elements striking against it. This is because, if the external housing is pushed in too sharply, it can strike against this front edge of the external housing with a relatively high force, and possibly cause undesirable damage there. The front edge provides a component that is in itself stable and counters the above-mentioned situations, and thus provides a covering protection on the front of specifically this front edge of the external housing.

In particular, it is provided for the frame to take a form that runs around the entire periphery. This further improves the said protective effect, and the frame is also more rigid and more stable in itself.

Preferably, it is provided for a wall of the internal container to extend between the front edge of the external housing and the frame, and to be pressed against the front edge by the frame. In this context, the frame therefore also serves as a positioning element for the external housing and a region of a wall of the internal container that comes up to this front edge. Preferably, it is provided here for this wall region of the internal container to be laid, at least in certain regions, around the front edge in the form of an arc, so to speak, with the result that when viewed from the front it also at least partly covers the front edge of the external housing on the front. This provides, so to speak, a multilayer construction that includes on the one hand, as seen in this direction of the depth of the domestic refrigeration appliance, the front edge of the external housing and the region of this wall of the internal container that adjoins it, in that case in particular toward the front, and is inserted into it or arcs around it. It is specifically with this multiple layering of wall regions of the external housing and the internal container that an appropriate protection, and indeed a positioning aid and fixing aid for these wall regions, are provided by the, once again, forwardly adjoining frame.

Preferably, it is provided for a sealing element to be arranged on a side of the frame facing the front edge of the external housing and thus, as seen in a direction of depth, a rear side of the frame. This is a very advantageous embodiment, since in this way, and going beyond the above-mentioned functionalities of the frame, a sealing action is also provided at this interface between the frame and the front edge of the external housing. There is furthermore an improvement in preventing media from passing through, in particular in respect of an impairment to the respectively prevailing temperature conditions in the icemaker on the one hand and in the receiving space on the other.

Preferably, it is provided for the sealing element to be a compressible sealing strip. As a result of this embodiment, the sealing action can be further improved and may also be kept high everywhere, in particular also peripherally. Thus, if there are assembly tolerances and/or manufacturing tolerances for individual components, this compressible sealing strip can also provide an appropriate compensation and hence also the sealing action can be achieved and maintained at all points.

In particular, it is provided for the frame to take the form of a channel, as seen in cross section perpendicular to a peripheral length, and at least in certain regions over its peripheral length. As a result, on the one hand the receiving of further components in this channel region, for example a sealing element, is improved such that this further element is arranged, and remains, embedded and in a precise position. Furthermore, this corresponding shaping of the frame may also improve the abutment against and/or connection to the front edge of the external housing. Here too, it is thus possible to provide greater security of positioning and also a mechanically more stable fastening.

Preferably, it is provided for the frame to be mounted floating on the front edge. This too can compensate positioning tolerances that occur and in particular can in turn also keep the thermal insulation effect high at this interface between the frame and the front edge of the external housing.

The frame is mounted floating, as mentioned above, preferably by undercuts in the frame itself, wherein in particular an advantageous counter-pressure is also generated by the sealing element, in particular the compressible sealing strip, in order to keep the frame in position.

Preferably, it is provided for a receiving container of the icemaker, which can be pushed into and pulled out of the external housing and is constructed for receiving the shaped ice elements, to abut against a front side of the frame by means of a front wall when the receiving container is in the pushed-in condition. This receiving container thus includes, as well as the front wall, preferably also a tray region in which these shaped ice elements that have been removed from an ice shaping dish of the icemaker are then collected. This front wall thus also forms a front abutment and a closure. It is specifically the frame, which lies between the front wall and the front edge of the external housing, that accordingly realizes the above-mentioned advantages. This frame is then able to take up correspondingly greater forces, which occur for example when the receiving container is closed. Furthermore, the front side of this frame takes a particularly even and smooth form, so the front wall is provided with a seating on the frame that has a large surface area and thus closes well.

In the closed condition of the receiving container, the front wall also provides a front cover for the charging opening of the external housing of the icemaker.

Preferably, it is provided for a sealing element that is arranged on the front wall of the receiving container to abut against this front side of the frame when the receiving container is in the pushed-in condition. This too provides a further improvement in respect of media-tightness at this specific further interface. This too thus prevents an undesired passage of media, which would result in an undesired thermal effect in the icemaker, in particular an undesired warming in this external housing, as a result of which the shaped ice elements to be produced would take longer to solidify and/or shaped ice elements that had been prepared and received in the receiving container could possibly thaw again.

In a further advantageous embodiment, it is provided for at least one rib that projects forward in the direction of the front wall to be constructed on the front side of the frame. As a result of a construction of this kind, the sealing action at this interface between the frame and the front wall of the receiving container is further improved. In the context, it may be provided for a type of seal labyrinth, so to speak, to be provided.

In particular, it is provided for the rib to take a form that runs around the entire periphery, as seen in the direction of its peripheral length. This provides an uninterrupted structure that has the same functionality at all points and is advantageous everywhere for the said improvement in the seal-tightness.

It may also be provided, when the receiving container is in the pushed-in condition, for the rib to be arranged abutting laterally against the sealing element of the front wall of the receiving container, as seen in the widthwise direction of the domestic refrigeration appliance. In addition, or instead of this, it may be provided, in the pushed-in condition of the receiving container, for this rib or another, different rib to abut against the sealing element of the front wall from the front, as seen in the direction of depth of the domestic refrigeration appliance. This may further improve the said sealing action and hence the thermal insulation effect.

It is also possible to provide a contact-making positioning between the rib and the sealing element of the front wall, in which a certain contact pressure or pressing of the rib against this sealing element is provided. This too can result in further improvements in relation to the in particular air-tight closure at this interface.

In particular, it is provided for there to be arranged on the frame a connection element to which a supplementary component of the icemaker can be attached in pivotal manner. In particular, this at least one connection element is constructed to be integrally formed on the frame and thus to be constructed in one piece therewith. As a result, at least one separate supplementary component can be held in a secure position on the frame and can be moved individually and precisely in relation thereto. This reduces the number of components and prevents undesired positioning tolerances between the individual components. As a result of this functionality, the supplementary component then also contributes to simple handling, in particular movement of the receiving container on the one hand and reliable closure or covering of the charging opening on the other.

In particular, it is provided for the supplementary component to be an additional cover for covering the charging opening at the front.

Advantageously, with a configuration of this kind, it is provided for the front wall of the receiving container to be of relatively small construction and, in a plane that spans the widthwise direction and the height direction of the domestic refrigeration appliance, to have substantially only slightly larger dimensions than the tray region itself of the receiving container. This results in simple handling of the receiving container when it is pulled out of and pushed into the external housing. This enhances handling and user-friendliness. So that in that case the charging opening, which is larger than these, can still be completely covered, however, the supplementary component, which is separate therefrom, is in particular used as a cover. The further cover, which then also takes the form of a pivotal flap, is arranged in a functionally operative connection with the front wall of the receiving container. In this way, this additional cover can be arranged with a spring pre-tensioning and, in the closed condition of the receiving container, is also pressed by the front wall into the position in which it closes the charging opening. When the receiving container is pulled out, the spring pre-tensioning of this additional cover is then likewise pressed out of its initial position and into an open position. Moreover, it can then also be opened further by way of this automatically adopted intermediate position, in that it is further opened manually by a user, by being pivoted further outward about its pivot axis. This then makes access over the entire surface possible through this charging opening region, which is covered by this additional cover, with the result that complete access to the above-mentioned ice shaping dish and further components in the external housing that are part of the icemaker is also possible.

It may be provided for the frame to take a form that is of a different color and/or structure from the front wall of the receiving container and/or the tray region of the receiving container and/or the front edge of the external housing. This makes it possible to pick points out visually. Likewise, it is possible for example to print on the frame, in particular the front side of the frame. In this way too, additional visual effects can be created and/or individual items of information can be presented.

Preferably, the domestic refrigeration appliance is constructed to have a first receiving space, which forms a refrigerator compartment and on which the icemaker is arranged. In particular, the domestic refrigeration appliance moreover includes a second receiving space that is separated from the first receiving space and is a freezer compartment. Preferably, the at least one first receiving space is arranged above the second receiving space, as seen in the height direction of the domestic refrigeration appliance. In particular, the first receiving space may be closed by two separate doors that are each pivotal about a vertical pivot axis. The second receiving space may in particular be closed by a further door, which is separate therefrom and is in particular a front wall of a drawer or a wheeled element that may be pushed into and pulled out of the receiving space.

The terms "top," "bottom," "front," "rear," "horizontal," "vertical," "direction of depth," "widthwise," "direction of height," etc. are used to specify the positions and orientations that obtain when the appliance is used properly and arranged for use and when an observer stands in front of the appliance and looks in the direction of the appliance.

Further features of the invention become apparent from the claims, figures and the description of the figures. The features and combinations of features mentioned above in the description, and the features and combinations of features mentioned below in the description of the figures and/or shown only in the figures, are not only usable in the combination specified in each case but also in other combinations without departing from the scope of the invention. Embodiments of the invention that are not explicitly shown in the figures or explained but which are apparent from the embodiments that are explained and producible from separate combinations of features should thus be regarded as included and disclosed. Embodiments and combinations of features that thus do not have all the features of an independent claim as filed should thus also be regarded as disclosed. Moreover, embodiments and combinations of features that go beyond the combinations of features set forth when the claims refer back or differ from these should be regarded as disclosed, in particular by the embodiments set forth above.

Other features which are considered as characteristic for the invention are set forth in the appended claims.

Although the invention is illustrated and described herein as embodied in a domestic refrigeration appliance having an external housing of an icemaker and a frame at the front, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 10 shows a perspective sectional illustration of a further exemplary embodiment of a frame that is arranged on the front edge of the external housing;

FIG. 11 shows an enlarged illustration of a partial region from FIG. 10;

In the figures, like or functionally like elements are provided with the same reference numerals.

DETAILED DESCRIPTION OF THE INVENTION

Figure 1:
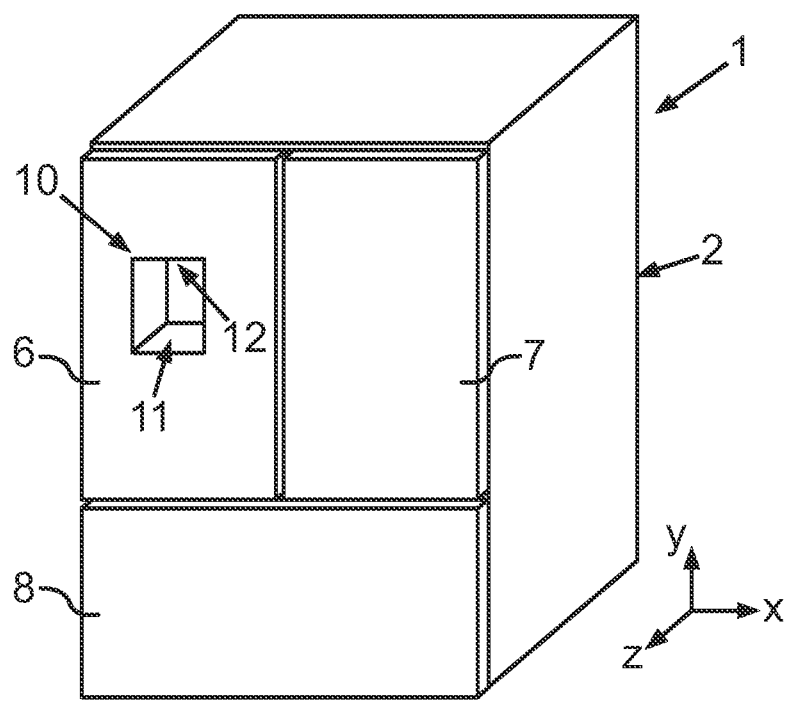
FIG. 1 shows a schematic perspective illustration of an exemplary embodiment of a domestic refrigeration appliance according to the invention.

Referring now to the figures of the drawing in detail and first, particularly, to FIG. 1 thereof, there is shown a schematic illustration of a domestic refrigeration appliance 1 that is intended for storing and preserving food. The domestic refrigeration appliance 1 takes the form of a combined fridge-freezer. It includes a housing 2 in which there is constructed a first receiving space 4 (FIG. 2) that is a refrigerator compartment. Furthermore, there is constructed in the housing 2 a second receiving space 5, separate from the first receiving space 4 (FIG. 2), which is a freezer compartment.

As can be seen from FIG. 1, the first receiving space 4 may be closed by two separate doors 6 and 7, which may be actuated independently of one another and are each pivotal in relation to the housing 2 about a vertical axis, which is thus oriented in the direction of height (y direction). The second receiving space 5 may be closed by a door 8 that is itself separate from these. The door 8 may be for example a front wall of a drawer that is mounted such that it can be pushed into and pulled out of the second receiving space 5.

Furthermore, the domestic refrigeration appliance 1 includes at least one icemaker 9 (FIG. 2), which is arranged outside the first receiving space 4 and thus outside the refrigerator compartment, and is intended to produce shaped ice elements, such as ice cubes or crushed ice.

In particular, the exemplary embodiment provides for the domestic refrigeration appliance 1 to have a dispenser unit that is intended to discharge at least shaped ice elements. The dispenser unit 10 (FIG. 1) may additionally also be intended to discharge liquid, in particular water or other beverages, in particular mixed beverages. The exemplary embodiment provides for the dispenser unit 10 to be constructed for discharge through the door 6, so that shaped ice elements or liquid can still be discharged in the closed condition of the door 6. For this purpose, the door 6 includes a hollow 11 in which a receiving vessel, in particular a drinking vessel, can be stood, with the result that the appropriate medium can be discharged through a discharging unit 12 that is part of the dispenser unit 10 and is arranged in the door 6 and opens into the hollow 11.

However, it may also be provided for discharge of this kind through the door 6 not to be provided and for example only the icemaker 9 to be provided, in which case it is only accessible by opening the door 6. Shaped ice elements that are produced can then be removed by taking out a receiving container (to be described in more detail below) that is part of the icemaker 9 and in which the shaped ice elements collect.

Figure 2:
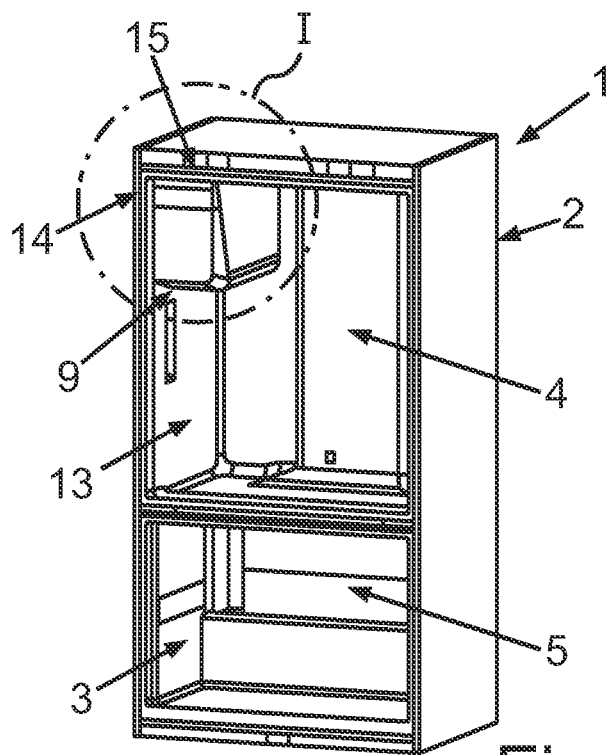
FIG. 2 shows a perspective illustration of the domestic refrigeration appliance from FIG. 1, without the doors that are shown in FIG. 1.

As can be seen from FIG. 2, the first receiving space 4 is delimited by walls of an internal container 13. This internal container 13 includes, in its top left corner region 14, an inset region 15 into which the icemaker 9 is inserted. The icemaker 9 is only accessible through the charging opening of the first receiving space 4. The icemaker 9 extends into the receiving space 4 in particular only in certain regions, and thus through at least one aperture or hole in the internal container 13 that delimits the receiving space 4 by means of its walls. The icemaker 9 is arranged at least such that a wall region, in particular a cover, of the icemaker 9 directly delimits the receiving space 4. In particular, there is provided a receiving container of the icemaker 9 that, by means of its front wall, forms this wall region directly delimiting the receiving space 4. This front wall is in particular only accessible through a front charging opening of the receiving space 4.

The receiving space 5 is likewise delimited by walls of an internal container 3.

Figure 3:
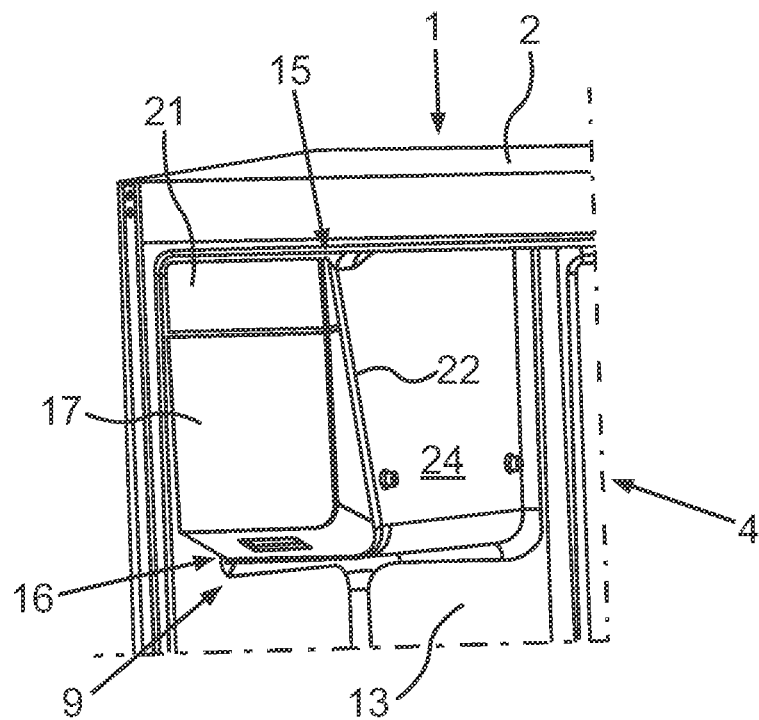
FIG. 3 shows an enlarged illustration of a partial region from FIG. 2.

FIG. 3 shows an enlarged illustration of a partial detail I in FIG. 2, in the region of the icemaker 9. This icemaker 9 includes the above-mentioned receiving container 16, which has a front wall 17 that, in the closed condition shown in FIG. 2 and FIG. 3, and thus in the completely pushed-in condition of the receiving container 16, at least partly closes a charging opening 18 (FIG. 4) of an external housing 19 (FIG. 4) of the icemaker 9.

In the exemplary embodiment, it is provided for this front wall 17, which is fixedly connected to a tray region 20 (FIG. 7) of the receiving container 16, additionally to be covered at the front by a further supplementary component in the form of a further cover 21 (FIG. 3). The front wall 17 and the further cover 21 are two separate components.

The receiving container 16 is mounted so that it can be pulled out of and pushed into the external housing 19. Moreover, both the above-mentioned ice shaping dish 50 and also if appropriate further components, such as a screw conveyor, etc., are provided in the external housing 19.

Figure 4:
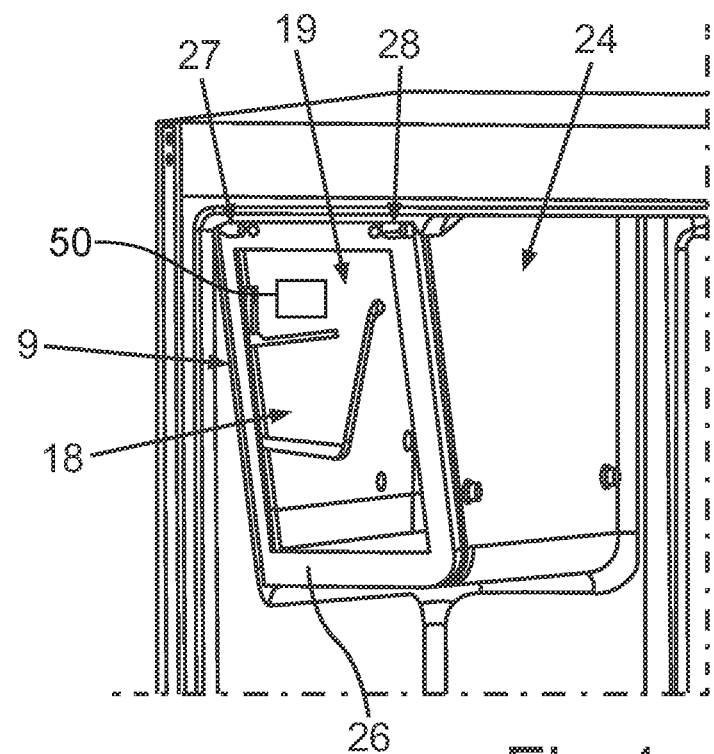
FIG. 4 shows the illustration as in FIG. 3, with the receiving container removed and the supplementary component taken away.

FIG. 4 shows the illustration as in FIG. 3, but without the receiving container 16 and also without the further cover 21. The view is thus looking into the interior of the external housing 19 of the icemaker 9.

Figure 5:
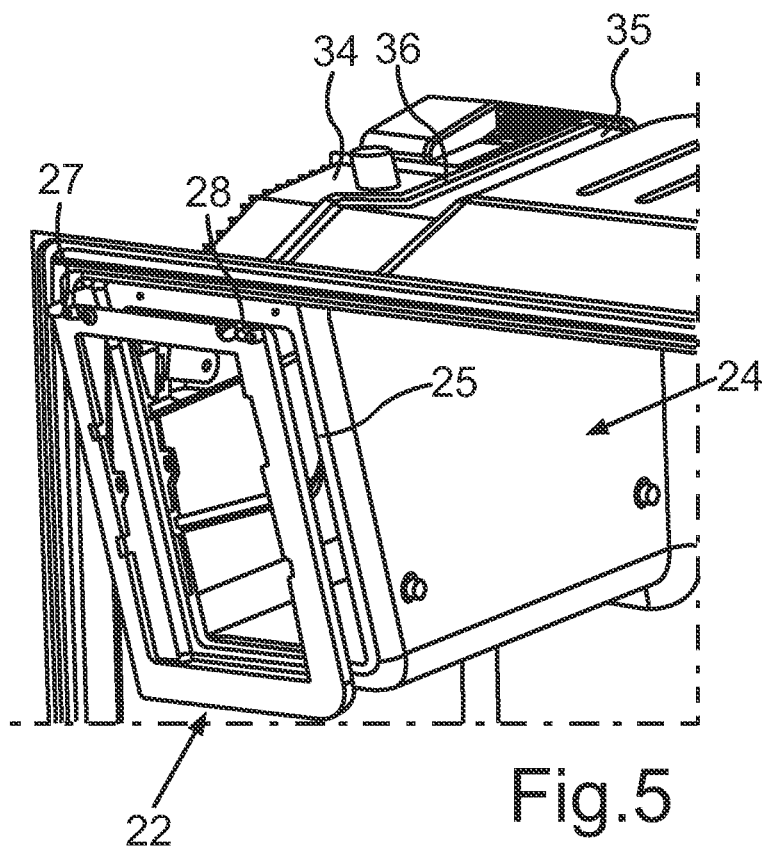
FIG. 5 shows an illustration as in FIG. 4, in which the frame has been taken off the front edge of the external housing of the icemaker.

FIG. 5 shows, in an illustration corresponding to FIG. 4, a view of the same components, with a separate frame 22 shown in exploded view. The frame 22, which runs around the entire periphery and is thus fully closed, preferably being rectangular and also constructed in one piece, covers—as seen in the direction of the depth of the domestic refrigeration appliance 1 and thus in the z direction—a front edge 23 (FIG. 8) of the external housing 19 at the front. The front edge 23 can also delimits the charging opening 18. As can be seen in FIG. 5, it is moreover provided in the exemplary embodiment for a wall region 24 of the internal container 13 to be arranged adjoining the external housing 19, such that the external housing 19 is covered toward the first receiving space 4 by this wall region 24. The wall region 24 extends as far as the front edge 23 and, by means of a bent-around wall region web 25, covers the front edge 23 at the front and thus from the front, as seen in the direction of depth, at least in certain regions.

The frame 22 covers this front edge 23 at the front, and moreover also covers this wall region web 25 at the front.

The frame 22 is in particular arranged floating in respect of the front edge 23 and the wall region web 25 such that appropriate tolerances can be compensated.

For this purpose, the frame 22 has in particular undercuts in order to enable a mounting of this kind. The undercuts are explained in more detail in FIGS. 10 to 12.

The one-piece frame 22, which is in particular made from plastics material, presses the wall region 24, in particular the wall region web 25, against the front edge 23 as well, such that appropriate positioning and fixing are made possible here too.

The frame 22 has a front side 26 (FIG. 4) against which the front wall 17 abuts when the receiving container 16 is in the pushed-in condition.

As can also already be seen from FIGS. 4 and 5, in the exemplary embodiment the frame 22 has a plurality of connection elements 27 and 28 that are integrated and on which the further cover 21 is mounted to pivot. As a result, these connection elements 27 and 28 also form a type of pivot hinge such that this second cover part 21 can be pivoted here about a horizontal axis.

Figure 6:
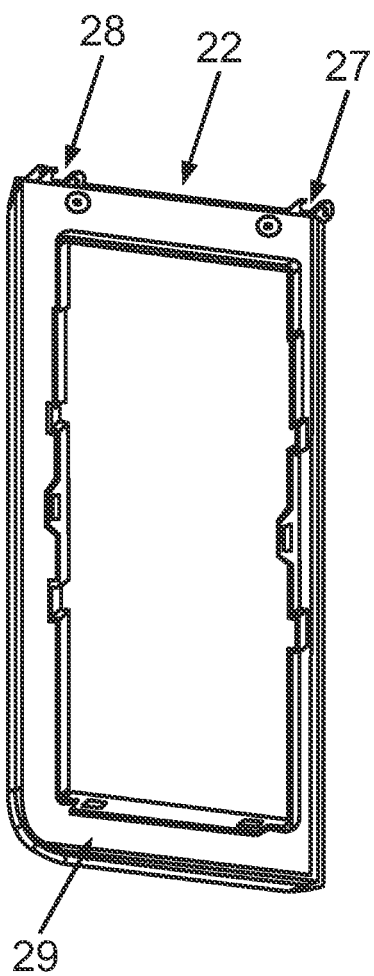
FIG. 6 shows a perspective illustration of an exemplary embodiment of the said frame.

FIG. 6 shows the frame 22 in a perspective view, on a rear side 29 that faces the front edge 23. As can also already be seen here, and as is further illustrated in the horizontal sectional illustrations of FIG. 7 to FIG. 9, as seen in the peripheral direction or over the peripheral length the frame 22 has, at least in certain regions, the shape of a channel in the cross section perpendicular to the peripheral length. Arranged in this channel shape there is in particular a sealing element (FIG. 8 and FIG. 9), which is in particular a peripheral sealing element 30. In particular, this sealing element 30 is a compressible sealing strip. As can already be seen from the perspective horizontal sectional illustration in FIG. 7 and the horizontal sectional illustrations in FIG. 8 and FIG. 9, this sealing element 30 likewise runs in particular around the entire periphery. In the assembled final condition, the sealing element 30 abuts against the outside of the wall region web 25.

Figure 7:
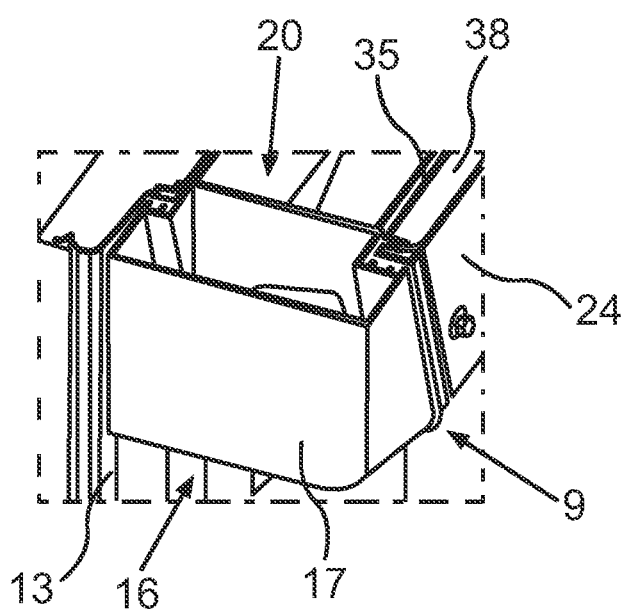
FIG. 7 shows a perspective sectional illustration of the view from FIG. 2 and FIG. 3, in the region of the icemaker.
Figure 8:
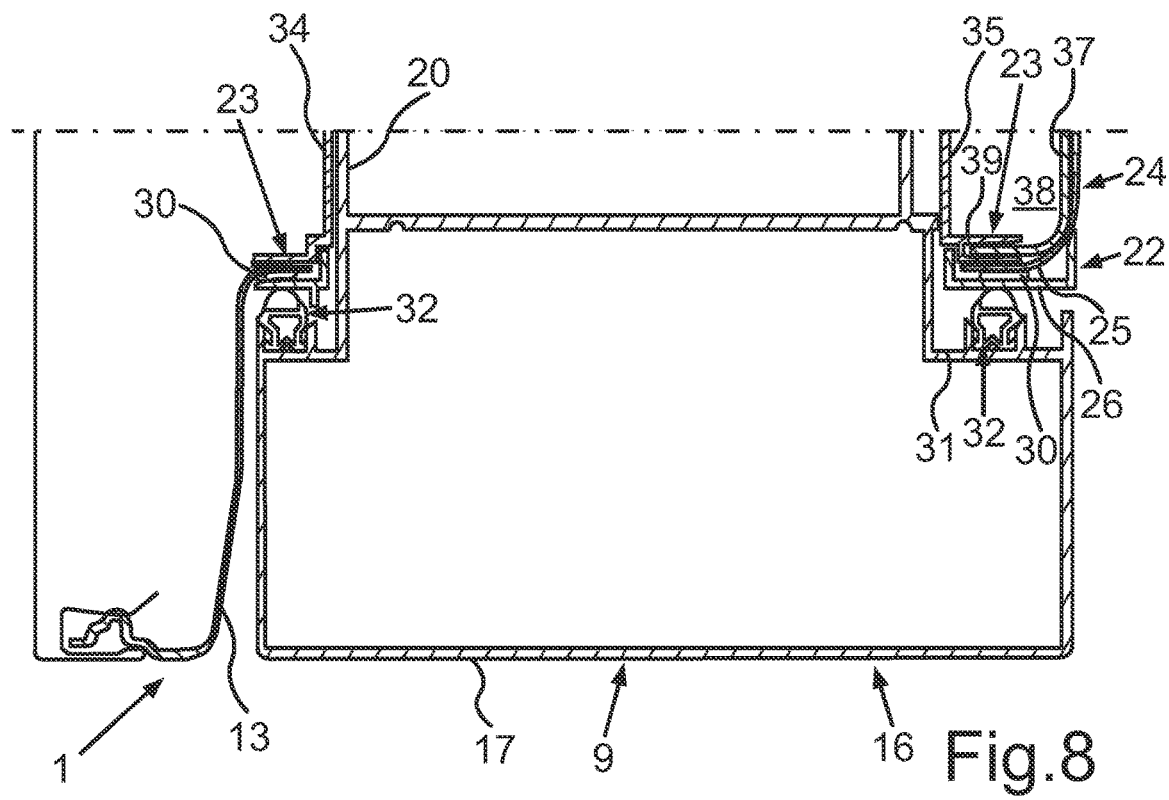
FIG. 8 shows the horizontal sectional illustration as in FIG. 7, in a first exemplary embodiment.
Figure 9:
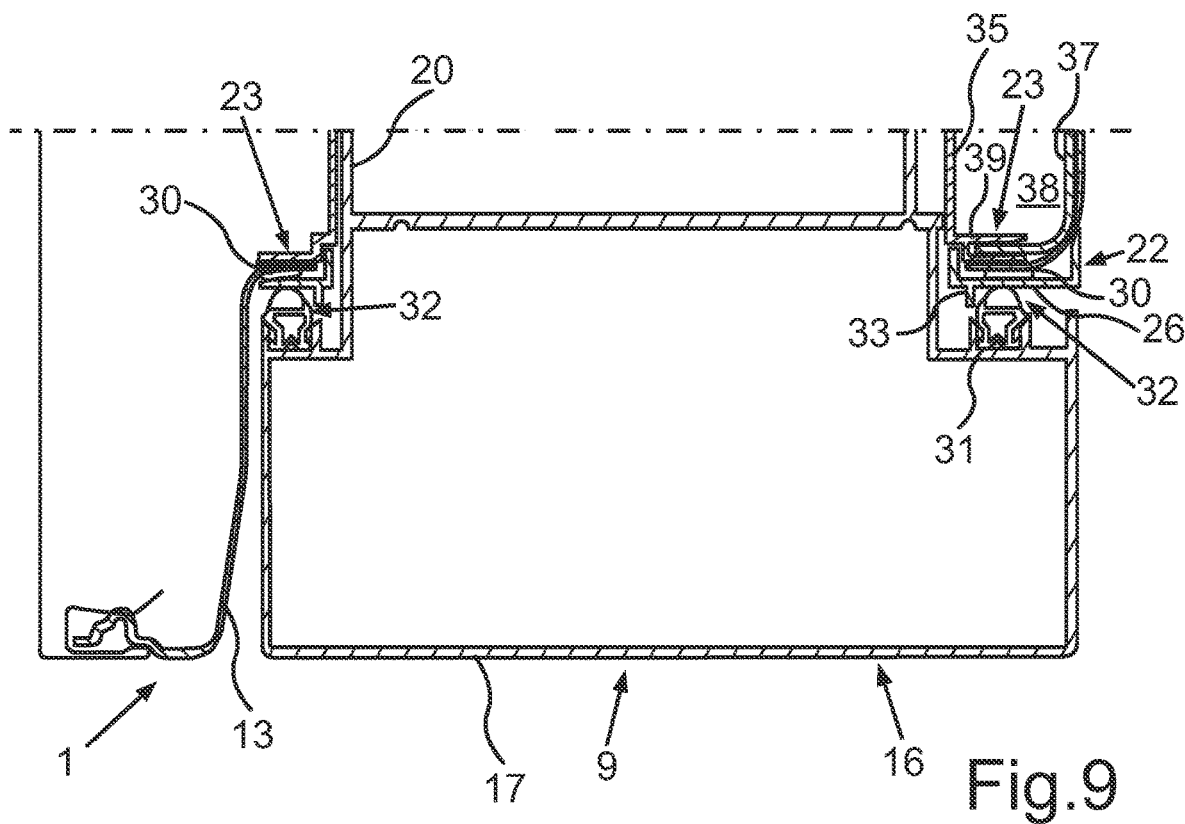
FIG. 9 shows a horizontal sectional illustration as in FIG. 8, in an exemplary embodiment that differs therefrom.

As can also be seen from the illustrations in FIG. 7 to FIG. 9, the front edge 23 and also the wall region web 25 penetrate into the channel that is formed by the frame 22, at least in certain regions, and so are embedded therein in certain regions.

Moreover, it can also be seen from the horizontal sectional illustration (where the plane of section is the x/z plane) in FIG. 8 that there is likewise arranged on a rear side 31 of the front wall 17 facing the frame 22 and in particular the front side 26 thereof a sealing element 32 which, in the closed condition of the receiving container 16, abuts against the front side 26.

In the exemplary embodiment of FIG. 9, which shows a corresponding horizontal sectional illustration to that in FIG. 8, in contrast to the embodiment in FIG. 8 it is provided in addition for a rib 33, which extends in the direction of the rear side 31 and thus also forward, to be integrally formed on the front side 26 of the frame 22. This rib 33, which may also be closed and run around the entire periphery, in operational connection with the sealing element 32 in particular results in a labyrinth, which has the effect of improving the sealing effect and thus the thermal insulation effect between the first receiving space 4 and the interior of the external housing 19 of the icemaker 9.

It may also be provided for the rib 33 to abut directly laterally against the sealing element 32, as seen in the widthwise direction and thus in the x direction, and/or likewise to abut directly, in particular being pressed, against the sealing element 32 as seen in the direction of depth and thus in the z direction.

The exemplary embodiment provides for the external housing 19 of the icemaker 9 to be constructed from a plurality of constituent parts that are joined together. Thus, in this case a first constituent part 34 (FIG. 5) and, separately therefrom, at an least second constituent part 35 (FIG. 5) are provided that are joined together at an interface connection 36 (FIG. 5), in particular being pushed into one another or inserted into one another.

Moreover, there is provided a further wall element 37, as shown in FIG. 8 and FIG. 9, which is arranged spaced from the constituent part 34 and the constituent part 35 in the region of those wall regions of the external housing 9 that face the receiving space 4. This further wall element 37 and the constituent part 35 create an intermediate space 38 that is filled with thermally insulating material, such that the icemaker 9, in particular the external housing 19, is arranged such that it is thermally insulated from the first receiving space 4 and also from the wall region 24. As can also be seen here in FIG. 8 and FIG. 9, the second constituent part 35 is joined to this additional wall element 37, in particular by a push-in connection, for which purpose in particular the second constituent part 35 has an insertion slot 39 into which the wall element 37 is inserted. This insertion slot 39 is in particular made on the front edge 23.

Figure 13:
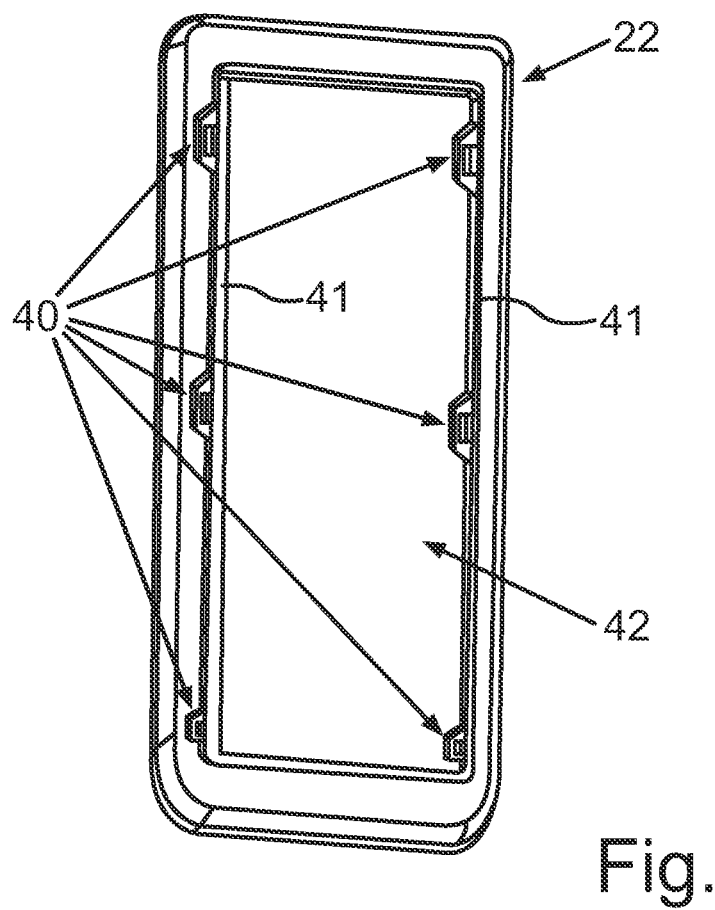
FIG. 13 shows a perspective illustration of the frame as in FIGS. 10 to 12.

FIG. 10 shows a perspective sectional illustration of the domestic refrigeration appliance 1 in the region of the external housing 19 of the icemaker 9. There, a frame 22 is arranged on the front edge 23. The frame 22 is in this case made in addition to or in particular instead of the connection elements 27 and 28, with connection elements 40 (FIG. 13) that are made on the rear side 29 and are oriented to project to the rear. This plurality of connection elements 40 is in particular constructed on an inner web 41 that delimits the channel-like shape of the frame 22 at this rear side 29 toward the hole 42 of the frame (FIG. 13). In particular, the connection elements 40 take the form of eyelets. The external housing 19 has, in the region of the front edge 23, the above-mentioned undercuts 43. The undercuts 43 in particular take the form of latching hooks which, in the assembled condition of the frame 22 on the front edge 23, are latched into the connection elements 40. The undercuts 43 are made in recesses 44, so that the connection between a connection element 40 and an undercut 43 is also arranged countersunk or embedded in the recess 44, and so is protected. There is no provision in this case for the pivoting that is enabled when the frame 22 is constructed around the connection elements 27 and 28.

FIG. 11 shows an enlarged illustration of a partial region I from FIG. 10. Here, the sealing element 30 can also be seen. Otherwise, the construction shown here is that also explained in relation to FIGS. 8 and 9. Moreover, it is provided here for the inner web 41 to penetrate into a slot 45 that is made on a forward edge of the external housing 19.

Figure 12:
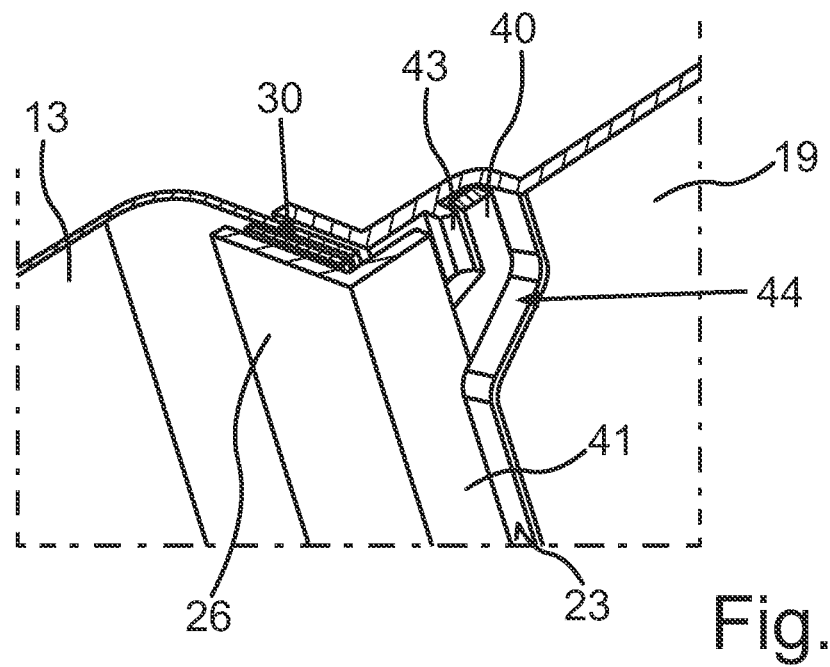
FIG. 12 shows a further sectional illustration of the frame, in the region of an undercut of the external housing.

FIG. 12 shows a further perspective sectional illustration of the structure from FIGS. 10 and 11, in the region of an undercut 43 and a connection element 40.

FIG. 13 shows the frame 22 from FIGS. 10 to 12, from the rear side 29.

The following is a summary list of reference numerals and the corresponding structure used in the above description of the invention:

1 Domestic refrigeration appliance
2 Housing
3 Internal container
4 First receiving space
5 Second receiving space
6 Door
7 Door
8 Door
9 Icemaker
10 Dispenser unit
11 Hollow
12 Discharging unit
13 Internal container
14 Left-hand corner region
15 Inset region
16 Receiving container
17 Front wall
18 Charging opening
19 External housing
20 Tray region
21 Cover
22 Frame
23 Front edge
24 Wall region
25 Wall region web
26 Front side
27 Connection element
28 Connection element
29 Rear side
30 Sealing element
31 Rear side
32 Sealing element
33 Rib
34 Constituent part
35 Constituent part
36 Interface connection
37 Wall element
38 Intermediate space
39 Insertion slot
40 Connection element
41 Inner web
42 Frame hole
43 Undercut
44 Recess
45 Slot

The invention claimed is:

1. A domestic refrigeration appliance, comprising:
 a housing in which there is formed at least one receiving space for food that is delimited by walls of an internal container;
 an icemaker with an external housing that is separate from said internal container, said icemaker further including ice maker components selected from the group consisting of an ice shaping dish and a shaped ice receiving container, and said external housing being formed with a charging opening through which said ice maker components are to be inserted into or removed from said external housing; and
 a frame separately formed and attached to a front edge of said external housing of said icemaker and delimiting said charging opening.

2. The domestic refrigeration appliance according to claim 1, wherein said internal container is formed with an inset region and said icemaker is inserted in said inset region.

3. The domestic refrigeration appliance according to claim 1, wherein said frame takes a form that runs around an entire periphery of said charging opening.

4. The domestic refrigeration appliance according to claim 1, wherein said internal container has a wall that extends between the front edge and said frame, and is pressed against the front edge by said frame.

5. The domestic refrigeration appliance according to claim 1, which comprises a sealing element arranged on a side of said frame facing the front edge.

6. The domestic refrigeration appliance according to claim 5, wherein said sealing element is a compressible sealing strip.

7. The domestic refrigeration appliance according to claim 1, wherein said frame is formed as a channel, in cross section, at least in certain regions over a peripheral length thereof.

8. The domestic refrigeration appliance according to claim 1, wherein said frame is mounted floating on the front edge.

9. The domestic refrigeration appliance according to claim 1, wherein said receiving container to be pushed into and pulled out of said external housing has a front wall, and wherein, when said receiving container is pushed in, said front wall of said receiving container abuts against a front side of said frame.

10. The domestic refrigeration appliance according to claim 9, which comprises a sealing element disposed on said front wall, wherein said sealing element abuts against the front side when said receiving container is pushed in.

11. The domestic refrigeration appliance according to claim 9, wherein at least one rib that projects in a direction of said front wall is formed on a front side, over a peripheral length of said frame.

12. The domestic refrigeration appliance according to claim 11, wherein said rib runs around an entire periphery.

13. The domestic refrigeration appliance according to claim 11, wherein, when said receiving container is pushed in, said rib abuts laterally against said sealing element of said front wall, as seen in a widthwise direction of the domestic refrigeration appliance, and/or abuts against said sealing element from the front, as seen in a depth direction of the domestic refrigeration appliance.

14. The domestic refrigeration appliance according to claim 1, which comprises at least one connection element disposed on said frame, for enabling a supplementary component of the icemaker to be pivotally attached thereto.

15. The domestic refrigeration appliance according to claim 14, wherein said supplementary component is an additional cover for covering said charging opening at the front.

16. The domestic refrigeration appliance according to claim 1, wherein said frame is latched to said external housing.

17. The domestic refrigeration appliance according to claim 1, wherein said frame is formed with connection elements oriented to project toward, and latch with, undercuts formed on a front edge of said external housing.

18. The domestic refrigeration appliance according to claim 17, wherein said connection elements are eyelets and said undercuts are latching hooks, and wherein, in an assembled condition of said frame, said latching hooks are latched into said connection elements.

* * * * *